United States Patent

Snibbe et al.

[11] Patent Number: 5,872,564
[45] Date of Patent: Feb. 16, 1999

[54] CONTROLLING TIME IN DIGITAL COMPOSITIONS

[75] Inventors: Scott S. Snibbe; Daniel Wilk, both of Seattle, Wash.; David Simons, Lynnfield, Mass.

[73] Assignee: Adobe Systems Incorporated, San Jose, Calif.

[21] Appl. No.: 692,085

[22] Filed: Aug. 7, 1996

[51] Int. Cl.[6] .................................................. G06F 3/00
[52] U.S. Cl. ................................... 345/302; 345/328
[58] Field of Search ..................................... 345/302, 473, 345/474, 475, 121, 327, 328; 348/441, 443, 459

[56] References Cited

U.S. PATENT DOCUMENTS

| 5,260,787 | 11/1993 | Capitant et al. | 348/459 |
| 5,313,281 | 5/1994 | Richards | 348/443 |
| 5,353,391 | 10/1994 | Cohen et al. | 345/435 |
| 5,410,358 | 4/1995 | Shackleton et al. | 348/459 |
| 5,508,750 | 4/1996 | Hewelett et al. | 348/558 |
| 5,659,382 | 8/1997 | Rybczynski | 352/46 |

*Primary Examiner*—Stephen S. Hong
*Attorney, Agent, or Firm*—Fish & Richardson P.C.

[57] ABSTRACT

Data for a temporal sequence of composition frames is created from data of a temporal sequence of footage frames by identifying a set of the footage frames temporally corresponding to a set of the composition frames and blending data from the set of footage frames to create data for the set of composition frames.

19 Claims, 3 Drawing Sheets

CONTROLLING TIME IN DIGITAL COMPOSITIONS

BACKGROUND

The invention relates to creating time-variable digital compositions, and more specifically to controlling the temporal dimension of such compositions.

A composition typically has a sequence of frames, each containing digital data describing, for example, the audio or visual content of the frame. When the composition is played, the frames are output at a composition frame rate. The temporal dimension of a composition is conveyed by the content of the output frames, as well as the rate at which those frames are output.

A composition includes at least one footage item, which also generally contains a sequence of frames. Examples of footage items include video clips, audio clips, and combination video/audio clips. Footage sequences may be individually created and edited, and are integrated to form the output composition. Accordingly, while a footage sequence generally is created at its own frame rate and has a temporal dimension that is controllable independently from that of other footage sequences for the composition, footage sequences are adapted to be output at the composition frame rate.

Thus, the temporal dimension of a footage sequence is controlled by mapping the data of footage frames to create data for the composition frames. Traditionally, the timing of a footage sequence is controlled by duplicating or deleting individual frames. For example, to lengthen the duration of a footage sequence, additional frames are added by duplicating individual existing frames; to shorten the duration of a footage sequence, the number of frames are decreased by deleting individual existing frames. However, editing requiring manual evaluation of individual frames is expensive, and editing without manual evaluation by automated processes can produce frame sequences that do not progress smoothly.

SUMMARY

The present invention controls the temporal dimension of a sequence of footage frames by smoothly blending data of the footage sequence to create data for a sequence of composition frames.

In general, in one aspect, the invention provides a computer-implemented method that identifies a first set of more than one footage frame temporally corresponding to the first composition frame and blends data of the first set of footage frames to create data for the first composition frame.

Embodiments of the invention may include one or more of the following features.

The method defines temporal correspondence between the temporal sequence of composition frames and the temporal sequence of footage frames, and identifies the first set of footage frames corresponding to the first composition frame in accordance with the defined temporal correspondence.

The method creates data for a second composition frame in the temporal sequence of composition frames from data of the temporal sequence of footage frames by identifying a second set of footage frames temporally corresponding to the second composition frame, wherein the number of frames in the second set of footage frames differs from the number of frames in the first set of footage frames. Data of the second set of footage frames is blended to create data for the second composition frame. In an embodiment that defines the temporal correspondence between the temporal sequence of composition frames and the temporal sequence of footage frames, the method identifies the second set of footage frames temporally corresponding to the second composition frame in accordance with the defined temporal correspondence.

The method determines a first composition time corresponding to the first composition frame and a first footage time interval corresponding to the first composition time, and identifies the first set of footage frames as the footage frames temporally corresponding to the first footage time interval. In an embodiment that defines the temporal correspondence between the temporal sequence of composition frames and the temporal sequence of footage frames, the first footage time interval is determined in accordance with the defined temporal correspondence.

The method blends data of the first set of footage frames in accordance with a filter function to create data for the first composition frame.

An embodiment that defines temporal correspondence between the temporal sequence of composition frames and the temporal sequence of footage frames displays a composition time graph of the temporal sequence of composition frames and a footage time graph of the temporal sequence of footage frames and receives an arbitrary function as user input. The arbitrary function defines correspondence between the composition time graph and the footage time graph, and the temporal correspondence between the temporal sequence of composition frames and the temporal sequence of footage frames is defined in accordance with the arbitrary function.

The method displays the composition time graph and footage time graph in a graph having the composition time graph as a first axis and the footage time graph as a second axis. A user draws an arbitrary function defining footage time as a function of composition time in the displayed graph of composition time versus footage time with an input device.

In general, in another aspect, the invention enables use of the computer-implemented method through a memory device storing computer-readable instructions for aiding a computer to create data for a sequence of composition frames from data of a sequence of footage frames.

Enabling the temporal dimension of footage sequences to be rescaled in composition sequences allows efficient synchronization of the footage sequences.

Other features and advantages of the invention will become apparent from the following description and from the claims.

DETAILED DESCRIPTION

The invention enables a user to control the temporal dimension of the data of a sequence of footage frames for use in a composition by mapping the data of the footage sequence to data for a sequence of composition frames, where the number of frames in the two sequences may differ.

For example, to output data of 60 frames of a footage sequence in 1 second at a composition frame rate of 30 frames per second (fps), the invention blends the data of the 60 footage frames to create data for 30 composition frames. Conversely, to output 15 frames of a footage sequence in 1 second at a composition frame rate of 30 fps, the invention interpolates from the data of the 15 footage frames to create data for 30 composition frames.

Figure 1:
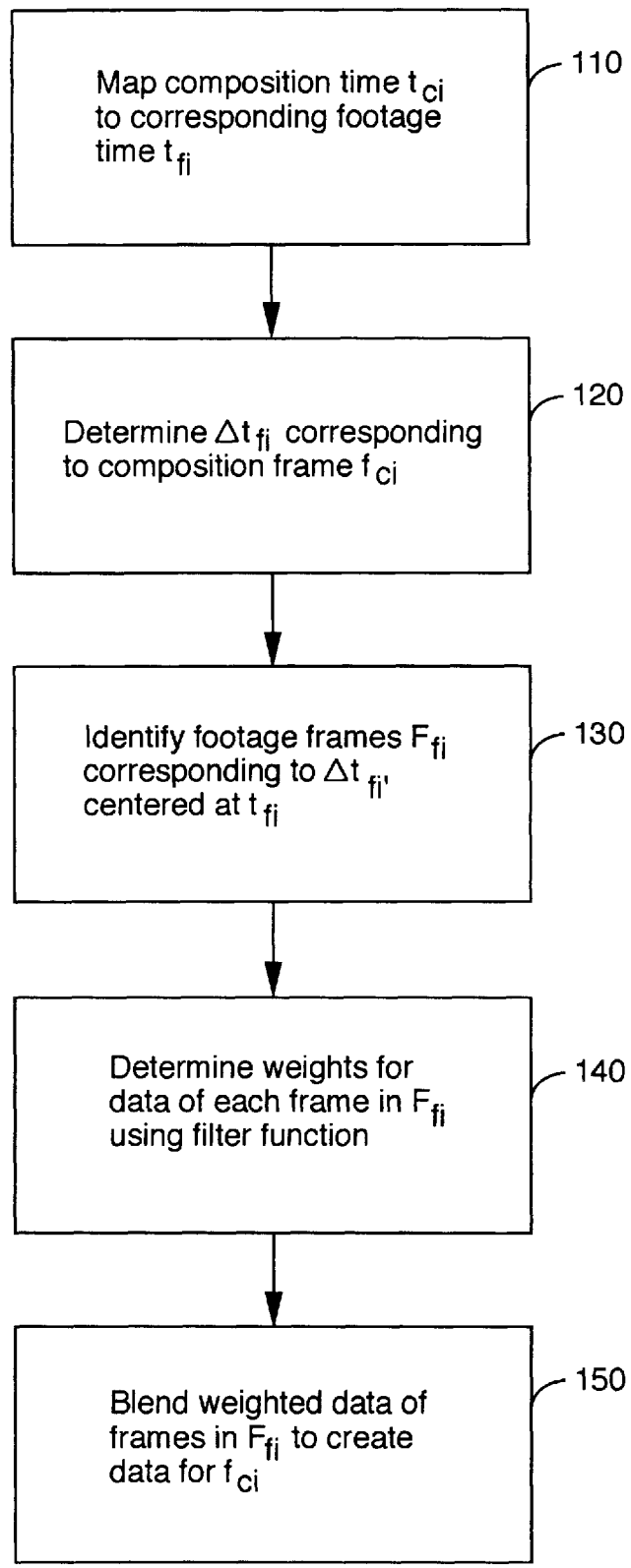
FIG. 1 is a flow diagram of a method for creating data for a frame of a composition sequence from data of a footage sequence.

Referring to FIG. 1, an embodiment creates data for a composition frame $f_{ci}$ corresponding to a specific composition time $t_{ci}$ by mapping $t_{ci}$ to a specific footage time $t_{fi}$ (110). Both the footage and the composition sequences have relative times. For example, if the footage sequence consists of 300 frames created at a frame rate of 30 fps, the footage sequence has a footage time $t_f$ ranging from 0 to 10 seconds. The composition sequence similarly has a time scale $t_c$.

The general function from $t_c$ to $t_f$ may be determined by various methods. For example, the mapping may be a constant linear function: a constant linear function $M(t_c)=t_f=2\ t_c$ maps data of a sequence of footage frames to be output in half the time.

Alternatively, a user may input an arbitrary function $M(t_c)$ that maps points in time in the composition sequence ($t_c$) to points in time in the footage sequence ($t_f$), to create a composition sequence that can play the data of the footage sequence faster, slower, or at the same speed, can freeze the data of the footage sequence in the composition sequence, and can play the data of the footage sequence backwards.

Figure 2:
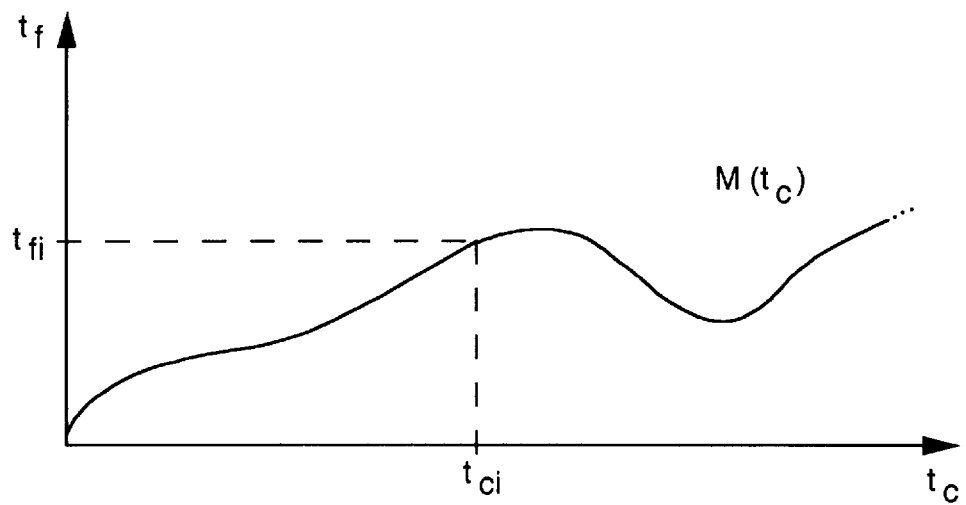
FIG. 2 is a graph of a function mapping composition time to footage time.

For example, FIG. 2 illustrates a possible function for $M(t_c)$. One embodiment includes a graphical user interface (GUI), displaying a graph ($t_f$ versus $t_c$), and an input device for allowing a user to draw an arbitrary function M, mapping composition time $t_c$ to footage time $t_f$, in the displayed graph. Possible input devices include a digitized pen and tablet, a mouse, and a joystick.

Once $t_{fi}$ is determined (110), the embodiment determines an increment of footage time $\Delta t_{fi}$ to correspond to the composition frame $f_{ci}$ (120). More specifically, given an arbitrary mapping function M such as that shown in FIG. 2, this embodiment uses the instantaneous derivative of $M(t_c)$ with respect to $t_c$ at $t_c=t_{ci}$ to determine $\Delta t_{fi}$:

$$\Delta t_{fi} = \frac{1}{r} \frac{dM(t_c)}{dt_c}$$

where r is the composition frame rate, in composition frames per second.

Footage time $\Delta t_{fi}$ is then centered at $t_{fi}$, and frames from the footage sequence falling within that interval of footage time form the set of footage frames $F_{fi}$ whose data is blended to create data for composition frame $f_{ci}$ (130).

To smoothly map the data of a footage sequence to data for a composition sequence, an embodiment creates data for composition frame $f_{ci}$ by blending data of footage frames $F_{fi}$ using a filter function (140). Various filter functions may be used. For example, one embodiment uses the truncated Gaussian curve illustrated in FIG. 3, adjusted for a composition frame $f_{ci}$ to have a standard deviation of $\Delta t_{fi}$. Another embodiment uses a truncated sine function, adjusted to have a cutoff frequency of $\frac{1}{2}\Delta t_{fi}$.

The filter function is applied to the data of footage frames $F_{fi}$ to determine the contribution of the data of each of the footage frames to create data for composition frame $f_{ci}$ (140). One embodiment determines the weighting based on the relative value of the filter function over the footage time for each footage frame in $F_{fi}$.

Figure 3:
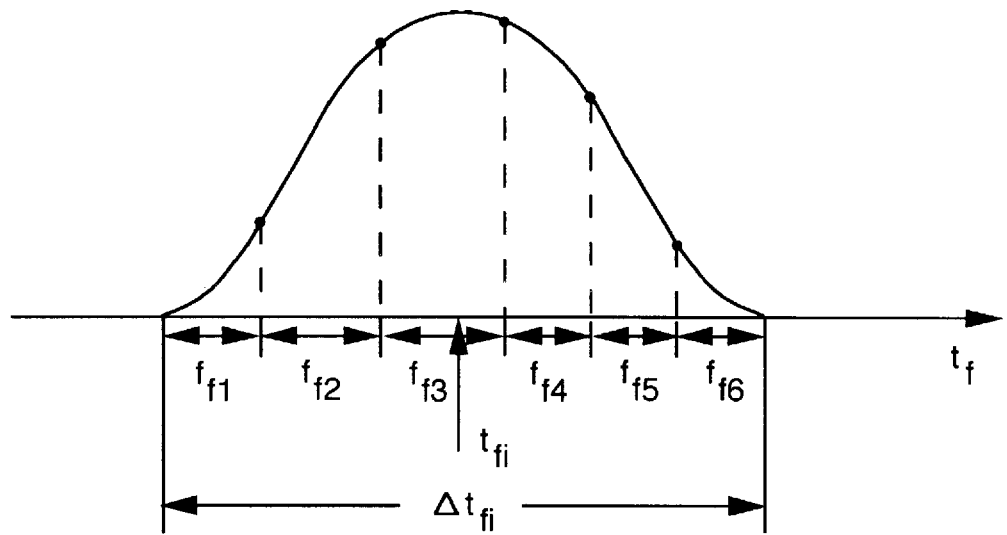
FIG. 3 shows a filter function.

Once the weights are determined for the footage frames in $F_{fi}$, the embodiment blends the weighted data of frames $F_{fi}$ to create the data for composition frame $f_{ci}$ (150). For example, FIG. 3 shows a time interval $\Delta t_{fi}$ as corresponding to $F_{fi}=\{f_{f1}, f_{f2}, f_{f3}, f_{f4}, f_{f5}, f_{f6}\}$. If the weights are $w_1=0.05$, $w_2=0.20$, $w_3=0.30$, $w_4=0.25$, $w_5=0.15$, and $w_6=0.05$ one embodiment creates data for $f_{ci}$ as the sum of the weighted data from the individual frames in $F_{fi}$: $0.05\ f_{f1}+0.20\ f_{f2}+0.30\ f_{f3}+0.25\ f_{f4}+0.15\ f_{f5}+0.05\ f_{f6}$.

While the invention is described in terms of a software implementation, the invention may be implemented in hardware or software, or a combination of both. Preferably, the invention is implemented in a software program executing on a programmable processing system comprising a processor, a data storage system, an input device, and an output device.

Figure 4:
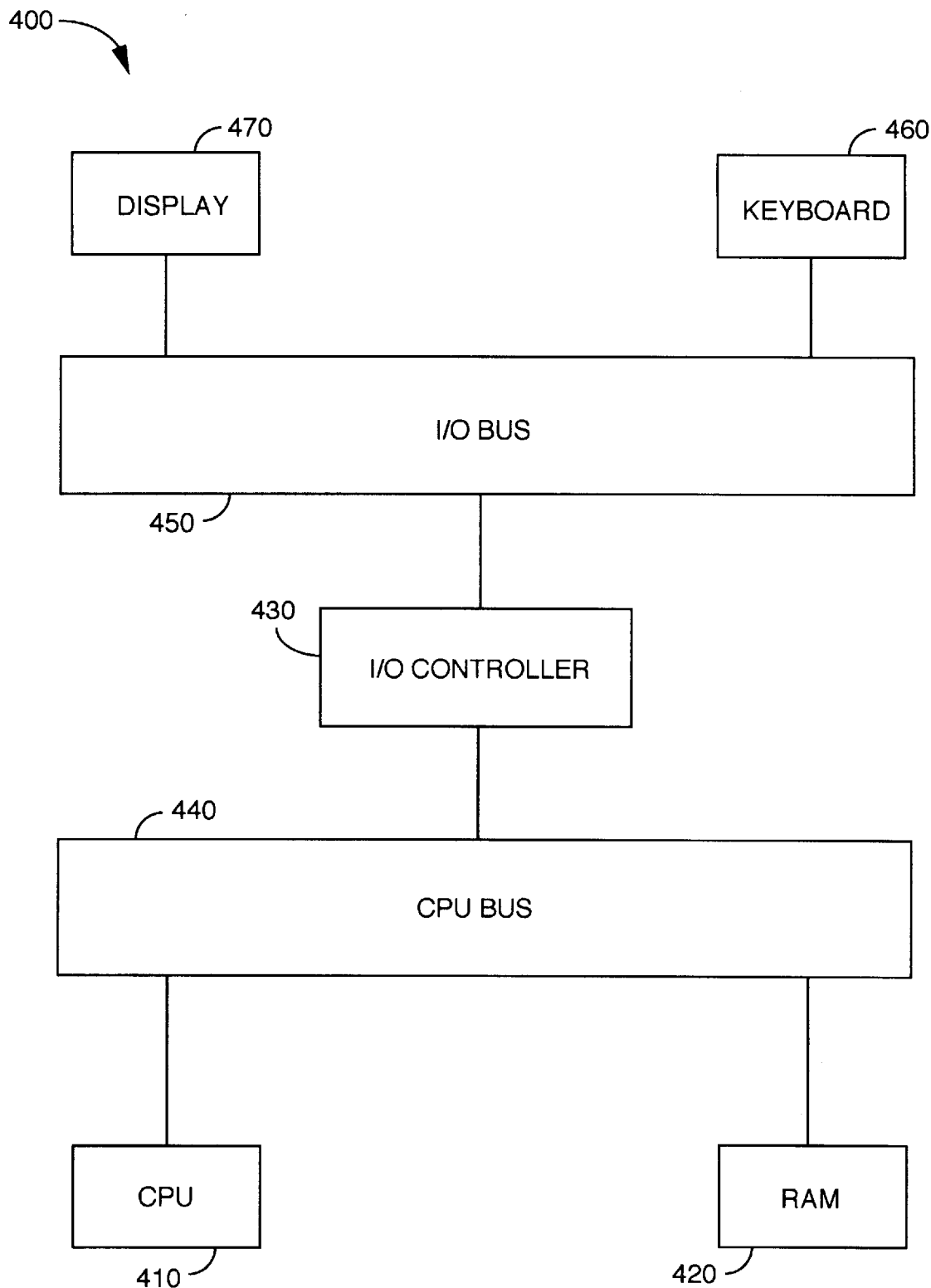
FIG. 4 illustrates a programmable processing system.

FIG. 4 illustrates one such programmable processing system 400, including a CPU 410, a RAM 420, and an I/O controller 430 coupled by a CPU bus 440. The I/O controller 430 is also coupled by an I/O bus 450 to input devices such as a keyboard 460, and output devices such as a display 470.

Other embodiments are within the scope of the following claims. For example, a variety of functions mapping composition time to footage time are possible. As discussed, the mapping function may be an arbitrary function specified by a user. Alternatively, the mapping function may be a constant linear function determined, for example, by different footage and composition frame rates.

Different methods may be provided to enable a user to specify a mapping function. In one embodiment, a user draws the function. In another embodiment, a user inputs the mapping function by defining the function (e.g., by defining $M(t_c)=t_f=2\ t_c$).

Different filter functions may be used. While the embodiment described used a Gaussian or a sine function, other arbitrary functions may be used.

What is claimed is:

1. A computer-implemented method for creating data for a first composition frame in a temporal sequence of composition frames from data of a temporal sequence of footage frames, comprising:

defining a temporal correspondence between the temporal sequence of composition frames and the temporal sequence of footage frames, the temporal correspondence determined by a user definable arbitrary nonlinear function $M(t_c)$ that maps points in time $t_c$ in the sequence of composition frames to points in time in the sequence of footage frames, whereby a user can create a resultant composition sequence that plays footage sequence frames faster and slower than a footage frame rate and out of temporal order;

identifying a first set of more than one footage frames temporally corresponding to the first composition frame in accordance with the user selectable arbitrary function; and blending data of the first set of footage frames to create data for the first composition frame.

2. The method of claim 1, further comprising creating data for a second composition frame in the temporal sequence of composition frames from data of the temporal sequence of footage frames, comprising:

identifying a second set of footage frames temporally corresponding to the second composition frame in accordance with the user selectable arbitrary function, wherein a number of frames in the second set of footage frames differs from a number of frames in the first set of footage frames; and blending data of the second set of footage frames to create data for the second composition frame.

3. The method of claim 1, further comprising creating data for a second composition frame in the temporal sequence of composition frames from data of the temporal sequence of footage frames, comprising:
identifying a second set of footage frames temporally corresponding to the second composition frame in accordance with the user selectable arbitrary function, wherein a number of frames in the second set of footage frames differs from a number of frames in the first set of footage frames; and
blending data of the second set of footage frames to create data for the second composition frame.

4. The method of claim 1, further comprising:
determining a first composition time corresponding to the first composition frame; and
determining a first footage time interval corresponding to the first composition time,
wherein the first set of footage frames temporally corresponding to the first composition frame temporally corresponds to the first footage time interval.

5. The method of claim 4, further comprising defining temporal correspondence between the temporal sequence of composition frames and the temporal sequence of footage frames, wherein the first footage time interval is determined in accordance with the defined temporal correspondence.

6. The method of claim 1, wherein data for the first set of footage frames is blended in accordance with a filter function to create data for the first composition frame.

7. The method of claim 1, further comprising:
displaying a composition time graph of the temporal sequence of composition frames and a footage time graph of the temporal sequence of footage frames; and
where the arbitrary function defines a correspondence between the composition time graph and the footage time graph.

8. The method of claim 7, wherein the composition time graph and the footage time graph are displayed in a graph having the composition time graph as a first axis and the footage time graph as a second axis.

9. The method of claim 8, wherein the arbitrary function defines footage time as a function of composition time.

10. The method of claim 8, wherein the arbitrary function is input by drawing the arbitrary function in the displayed graph of composition time versus footage time with an input device.

11. A memory device storing computer-readable instructions for aiding a computer to create data for a first composition frame in a temporal sequence of composition frames from data of a temporal sequence of footage frames, comprising:
instructions for defining a temporal correspondence between the temporal sequence of composition frames and the temporal sequence of footage frames, the temporal correspondence determined by a user definable arbitrary non-linear function $M(t_c)$ that maps points in time $t_c$ in the sequence of composition frames to points in time in the sequence of footage frames, whereby a user can create a resultant composition sequence that plays footage sequence frames faster and slower than a footage frame rate and out of temporal order;
instructions for identifying a first set of more than one footage frames temporally corresponding to the first composition frame; and
instructions for blending data of the first set of footage frames to create data for the first composition frame.

12. The memory device of claim 11, further comprising:
instructions for determining a first composition time corresponding to the first composition frame; and
instructions for determining a first footage time interval corresponding to the first composition time.

13. The memory device of claim 12, wherein the first footage time interval is defined in accordance with the user selectable arbitrary function.

14. The memory device of claim 11, wherein instructions for blending data blend the first set of footage frames in accordance with a filter function to create data for the first composition frame.

15. The memory device of claim 11, further comprising:
instructions for displaying a composition time graph of the temporal sequence of composition frames and a footage time graph of the temporal sequence of footage frames;
where the arbitrary function defines a correspondence between the composition time graph and the footage time graph.

16. The memory device of claim 15, wherein instructions for displaying the composition time graph and the footage time graph comprise instructions for displaying a graph having the composition time graph as a first axis and the footage time graph as a second axis.

17. The memory device of claim 16, wherein the arbitrary function defines footage time as a function of composition time.

18. A computer-implemented method for creating data for a temporal sequence of composition frames from data of a temporal sequence of footage frames, comprising:
defining a temporal correspondence between the temporal sequence of composition frames and the temporal sequence of footage frames, the temporal correspondence determined by a user definable arbitrary non-linear function $M(t_c)$ that mass points in time $t_c$ in the sequence of composition frames to points in time in the sequence of footage frames, whereby a user can create a resultant composition sequence that plays footage sequence frames faster and slower than a footage frame rate and out of temporal order;
identifying a footage frame set from the temporal sequence of footage frames temporally corresponding to a composition frame set from the temporal sequence of composition frames, wherein the number of frames in the footage frame set differs from the number of frames in the composition frame set; and
blending data of the footage frame set to create data for the composition frame set.

19. The method of claim 18, wherein the data of the footage frame set is blended in accordance with a filter function to create data for the composition frame set.

* * * * *